(12) United States Patent
Fallahi et al.

(10) Patent No.: US 6,314,733 B1
(45) Date of Patent: Nov. 13, 2001

(54) CONTROL METHOD

(75) Inventors: Abdolreza Fallahi, Harrow; Gary Brian Forward, New Southgate, both of (GB)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/160,726

(22) Filed: Sep. 25, 1998

(30) Foreign Application Priority Data

Sep. 26, 1997 (GB) .................................................. 9720430

(51) Int. Cl.$^7$ ...................................................... F02B 33/44
(52) U.S. Cl. ............................................. 60/598; 60/605.1
(58) Field of Search ........................... 60/598, 601, 605.1

(56) References Cited

U.S. PATENT DOCUMENTS

| | | | |
|---|---|---|---|
| 4,492,203 | * 1/1985 | Yutaka | 60/601 |
| 4,720,977 | 1/1988 | Giesen Kalus et al. | |
| 5,174,119 | * 12/1992 | Hanover et al. | 60/602 |
| 5,505,179 | * 4/1996 | Brennan | 123/479 |
| 5,546,795 | 8/1996 | Yoichiro | |
| 5,585,553 | 12/1996 | Schricker | |

FOREIGN PATENT DOCUMENTS

| | | |
|---|---|---|
| 0 769 612 | 4/1997 | (EP) . |
| 4032451 | * 4/1992 | (GB) . |

OTHER PUBLICATIONS

"A Variable–Geometry Turbocharger Control System For High Output Diesel Engines", SAE 880118, Watson et al., 1988.*

"Turbocharged Matching on the Hino K13C Charge–Cooled Heavy–Duty Engine", C484/009 ©IMECHE, Yabe et al., 1994.*

* cited by examiner

*Primary Examiner*—Noah P. Kamen
(74) *Attorney, Agent, or Firm*—Andrus, Sceales, Starke & Sawall

(57) ABSTRACT

A control method for use in controlling the operation of a turbo-charged engine comprises the steps of:

using at least one engine parameter to derive a predicted transient air pressure value;

sensing an actual air pressure value using a pressure sensor; and comparing the actual air pressure value with the predicted transient air pressure value to determine a predicted boost pressure error. The boost pressure error may be used in determining whether or not the pressure sensor is operating properly. It may also be used in determining whether the engine is in a transient condition, allowing the improvement in the response of the turbocharger and this reduces turbo-lag.

2 Claims, 2 Drawing Sheets

CONTROL METHOD

FIELD OF THE INVENTION

This invention relates to a method of controlling the operation of an exhaust gas turbo-charged internal combustion engine.

BACKGROUND OF THE INVENTION

It is known, for example see U.S. Pat. No. 4,720,977, to sense the pressure of air supplied to a turbo-charged diesel engine, and to use the sensed air pressure in controlling the timing of fuel delivery to the engine. For example, if the air pressure differs from a predetermined steady state air pressure as occurs during acceleration, the timing of fuel delivery can be changed to alter the combustion characteristics so that the energy contained in the exhaust gases is increased causing the speed of rotation of the turbine of the turbo-charger to rise. As a result, the pressure of air supplied to the engine is increased, thereby allowing more fuel to be burned in the engine and hence permitting an increase the torque of the engine.

By monitoring the air pressure supplied to the engine and using the measured air pressure in controlling the quantity of fuel delivered to the engine, the increase in output torque occurs earlier than would otherwise be the case thus "turbo lag" is reduced.

The amount of boost air supplied to the engine limits the maximum quantity of fuel supplied and this is important in controlling smoke emitted by the engine.

Clearly, if the air pressure sensor fails, such a system would not operate correctly. It is known to control the engine using a fixed default air pressure value in such circumstances but this is disadvantageous in that such a value will not be ideal and hence the power output of the engine may be reduced to reduce smoke emissions.

It is an object of the invention to provide a control method in which the disadvantageous effects set out hereinbefore are reduced.

According to the present invention there is provided a method of controlling a turbocharged engine comprising the steps of:

(a) using at least one engine parameter to derive a predicted transient air pressure;

(b) sensing an actual air pressure using a pressure sensor; and (c) comparing the predicted transient air pressure with the actual air pressure to determine a predicted boost pressure error.

The method may comprise the additional step of determining whether the predicted boost pressure error falls within an acceptable range. The result of this additional step can be used to provide an indication of whether the air pressure sensor is functioning correctly—if the predicted transient air pressure is significantly different from the actual air pressure as may be the case if the pressure sensor has failed, then the predicted boost pressure error will be high.

If it is determined that the air pressure sensor has failed, then conveniently the predicted transient air pressure is used in controlling the quantity of fuel delivered to the engine rather than using a fixed default value as in the prior arrangements. As a result, the output power of the engine can be maintained rather than reduced as in the prior arrangements.

The method conveniently includes the step of determining, using the predicted boost pressure error, whether the engine is in a transient condition. If it is determined that the engine is in a transient condition, then an advance offset may be derived using (i) either the actual air pressure or the predicted transient air pressure and (ii) a predicted steady state air pressure derived using at least one engine parameter, the advance offset being used to determine the timing of fuel delivery to the engine.

The invention will further be described, by way of example, with reference to the accompanying drawings, in which:

DETAILED DESCRIPTION OF THE INVENTION

Figure 1:
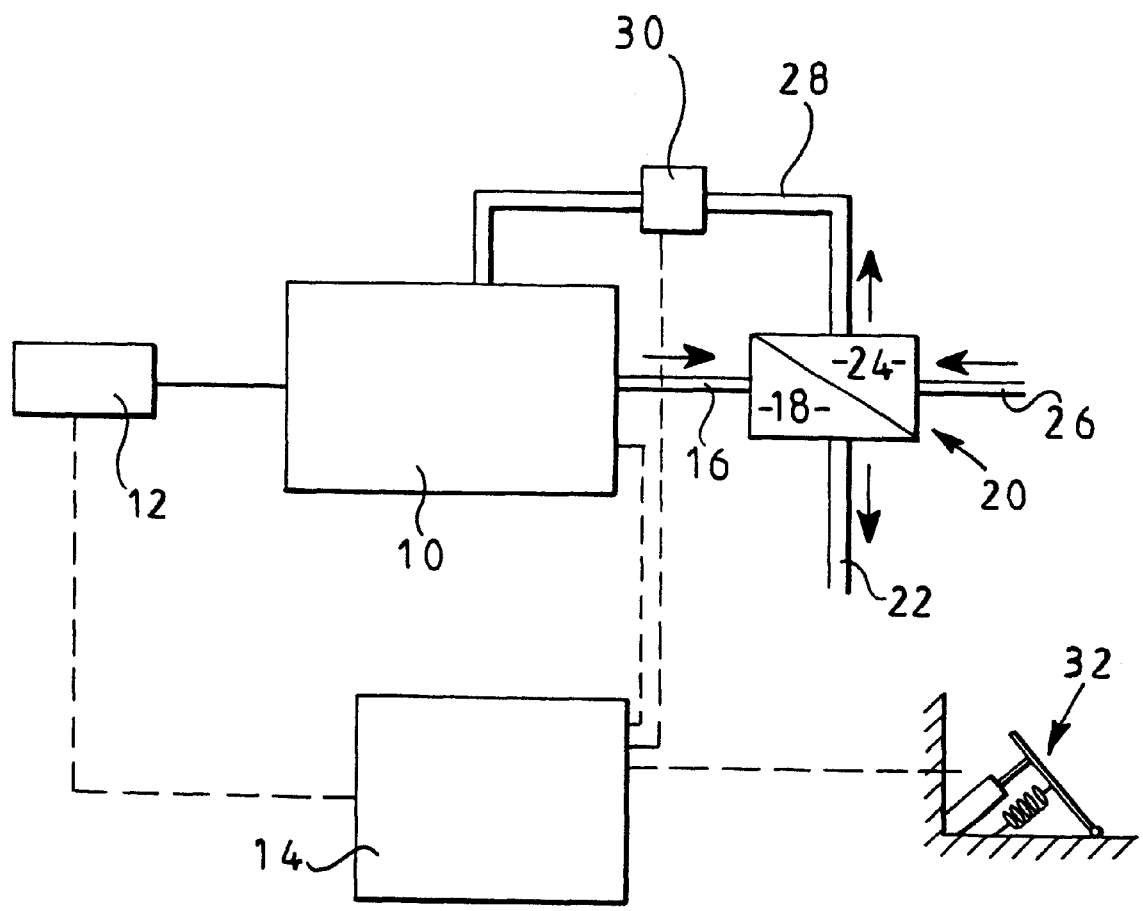
FIG. 1 is a diagrammatic illustration of a turbo-charged engine.

FIG. 1 illustrates, in diagrammatic form, a turbo-charged diesel internal combustion engine 10 which is supplied with fuel under pressure by a high pressure fuel pump 12. The pump 12 is controlled by a control unit 14 which is arranged to control the quantity of fuel supplied to the engine 10 and the timing of fuel delivery to the engine 10. Exhaust gases from the engine 10 are supplied through a passage 16 to the turbine 18 of a turbo-charger 20, the exhaust gases subsequently escaping from the turbine 18 through a passage 22.

The flow of exhaust gases through the turbine 18 causes the turbine 18 to rotate driving a compressor 24 of the turbo-charger 20. The compressor 24 draws air through a passage 26 to pressurize air in a passage 28 from which air is supplied to the cylinders of the engine 10.

A pressure sensor 30 is located in the passage 28 to monitor the pressure of air supplied to the engine 10, the output of the pressure sensor 30 being supplied to the controller 14. The controller 14 also receives signals indicative of the engine speed and indicative of the position of a throttle control 32 associated with the engine 10.

Figure 2:
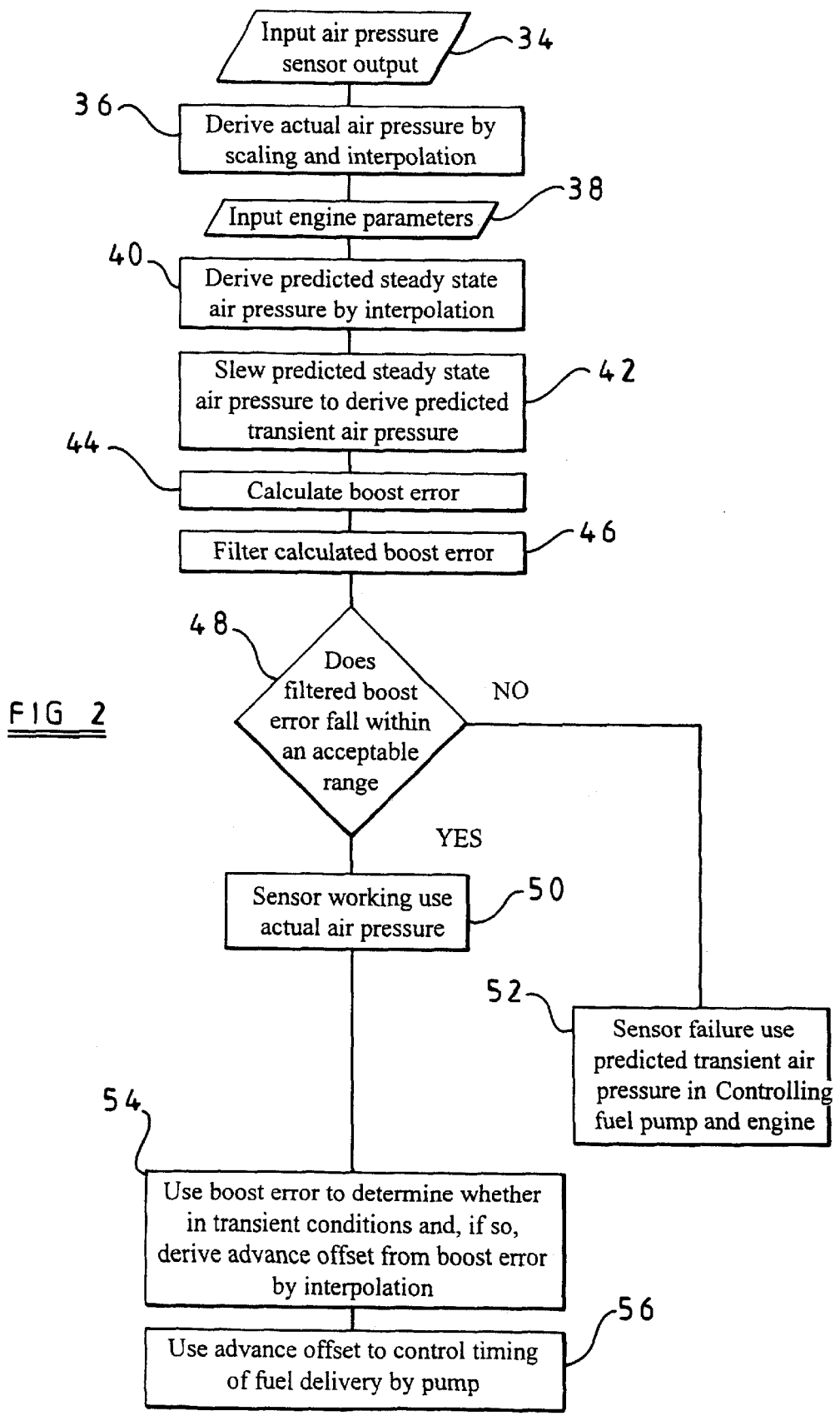
FIG. 2 is a flow diagram illustrating the method of an embodiment of the invention.

FIG. 2 is a flow chart illustrating the control method of an embodiment of the invention when used to control the operation of the engine 10 of FIG. 1.

In use, the throttle control 32 outputs a demand signal indicative of the quantity of fuel which should be supplied by the pump 12 to the engine 10. The controller 14 uses the demand signal to control the pump 12 so that an appropriate quantity of fuel is supplied to the engine 10. The controller 14 also receives a signal from the air pressure sensor 30 (step 34 in FIG. 2) and uses this signal to calculate the actual air pressure being supplied to the engine 10 (step 36). The calculation of the actual air pressure may, for example, involve the steps of scaling the signal produced by the pressure sensor 30 and using an appropriate look-up table to derive the actual air pressure from the scaled signal.

At steps 38 and 40 the controller 14 uses at least one engine parameter, in the arrangement of FIG. 1 the engine speed signal and fuel demand signal, to derive a predicted steady state air pressure value, the derivation of the predicted steady state air pressure value conveniently involving the use of an appropriate look-up table. A slew function is performed on the predicted steady state air pressure value at step 42 to derive a predicted transient air pressure value. The difference between the actual air pressure and the predicted transient air pressure value is calculated at step 44 (the difference being referred to hereinafter as the boost error), and at step 46 a filtering operation is performed on the boost error.

The filtered boost error is compared, at step 48, with predetermined values to determine whether the boost error falls within an acceptable range. If the boost error is small, falling within the acceptable range, the sensor 30 is operating substantially as expected (step 50). On the other hand, if the boost error is high, falling outside of the acceptable range, the sensor 30 may not be operating as expected and in these circumstances it is assumed that the sensor 30 has failed (step 52). In these circumstances, an appropriate indicator light is illuminated to inform the operator that the sensor 30 has failed. Additionally, in order to enable the engine 10 to continue to operate without significantly reducing its power output, the predicted steady state air pressure value derived in step 40 is used in controlling the pump 12 rather than the actual air pressure derived using the output of the sensor 30 in step 36 until appropriate remedial action has been taken to correct the operation of the sensor 30. By using the predicted steady state air pressure value rather than either the sensed air pressure value or a predetermined fixed value, the efficiency of operation of the engine in such circumstances can be improved.

Another way in which the boost pressure error can be used is in reducing turbo lag. In step 54 of FIG. 2, the value of the boost pressure error is used to determine whether transient conditions exist, for example by using the boost pressure error, other engine operating parameters and an appropriate look-up table, and if it is determined that the engine is in a transient condition, an advance offset is calculated or otherwise derived using the predicted steady state air pressure and actual air pressure. The advance offset is conveniently derived using an appropriate look-up table.

The advance offset is used in step 56 in the control of the timing of fuel delivery by the pump 12 to the engine 10, to alter the combustion characteristics of the engine 10 hence changing the energy within the exhaust gases available to drive the turbine 18 and causing the turbine 18 to reach the desired speed at a time earlier than would otherwise be the case, thus reducing turbo lag.

It will be appreciated that the timing of fuel delivery by the pump 12 is dependent upon a number of other factors, for example engine temperature, speed and load, and that these factors are taken into account in addition to the advance offset mentioned hereinbefore.

Other ways in which the boost error can be used include the control of waste gate or variable geometry turbos.

What is claimed is:

1. A method of controlling a turbo-charged diesel engine having an unthrottled inlet comprising the steps of:

(a) using at least one engine parameter to derive a predicted transient air pressure value;

(b) sensing an actual air pressure value using a pressure sensor;

(c) comparing the predicted transient air pressure value with the actual air pressure value to determine a predicted boost pressure error;

(d) determining whether the predicted boost pressure error falls within a predetermined acceptable range; and (e) activating an indicator indicative of a pressure sensor fault in the event that the predicted boost pressure error falls outside of the predetermined acceptable range.

2. A method of controlling a turbo-charged diesel engine having an unthrottled inlet comprising the steps of:

(a) using at least one engine parameter to derive a predicted transient air pressure value;

(b) sensing an actual air pressure value using a pressure sensor;

(c) comparing the predicted transient air pressure value with the actual air pressure value to determine a predicted boost pressure error;

(d) determining whether the predicted boost pressure error falls within a predetermined acceptable range; and (e) controlling subsequent operation of the engine using the predicted transient air pressure value rather than the actual air pressure value in the event that the predicted boost pressure error falls outside of the predetermined acceptable range.

\* \* \* \* \*